US009696552B1

(12) United States Patent
Goergen et al.

(10) Patent No.: US 9,696,552 B1
(45) Date of Patent: Jul. 4, 2017

(54) SYSTEM AND METHOD FOR PROVIDING AN AUGMENTED REALITY LIGHTWEIGHT CLIP-ON WEARABLE DEVICE

(71) Applicant: LOCKHEED MARTIN CORPORATION, Bethesda, MD (US)

(72) Inventors: Patrick John Goergen, Orlando, FL (US); Richard Paul Boggs, Orlando, FL (US); Gregory A. Harrison, Oviedo, FL (US); Hasan W. Schwandes, Orlando, FL (US); Danielle Holstine, Orlando, FL (US); Eric Sorokowsky, Winter Springs, FL (US); Cynthia M. Saelzer, Oviedo, FL (US); Stockwell Haines, Eustis, FL (US); Brandon Berk, Melbourne, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 14/594,791

(22) Filed: Jan. 12, 2015

Related U.S. Application Data

(60) Provisional application No. 61/926,178, filed on Jan. 10, 2014.

(51) Int. Cl.
*G02B 27/14* (2006.01)
*G02B 27/01* (2006.01)
*G02B 27/00* (2006.01)

(52) U.S. Cl.
CPC ..... *G02B 27/0176* (2013.01); *G02B 27/0093* (2013.01); *G02B 27/0101* (2013.01); *G02B 27/0149* (2013.01); *G02B 2027/0123* (2013.01); *G02B 2027/0154* (2013.01)

(58) Field of Classification Search
CPC G02B 27/145; G02B 27/143; G02B 27/1073; G02B 27/106; G02B 27/0172; G02B 27/0101; G02B 2027/0178; G02B 2027/0132; G02B 2027/0111; G02B 27/017; G02B 2027/0187; G02B 27/017
USPC .................................. 359/629–633; 345/7–9
See application file for complete search history.

(56) References Cited

U.S. PATENT DOCUMENTS 5,451,976 A * 9/1995 Ito ........................ G02B 27/017
345/8
5,796,374 A * 8/1998 Cone ................... G02B 27/0176
345/8
6,040,945 A * 3/2000 Karasawa .......... G02B 27/0172
348/E5.145

(Continued)

*Primary Examiner* — Scott J Sugarman
*Assistant Examiner* — Vipin Patel
(74) *Attorney, Agent, or Firm* — Terry M. Sanks, Esquire; Beusse Wolter Sanks & Maire, PLLC

(57) ABSTRACT

A system is disclosed including a mountable component configured with an attachment to allow the mountable component to be readily attached to and removed from an independent wearable garment, a positioning slide connected to the mountable component, a display mount connected to the positioning slide, a lens adjustment arm attached to the positioning slide, and a curved lens surface connected to the lens adjustment arm. The positioning slide is configured to move the lens and display mount in a back and forth direction and a left to right direction. Another system and method are also disclosed.

17 Claims, 5 Drawing Sheets

(56) References Cited

U.S. PATENT DOCUMENTS

| | | | |
|---|---|---|---|
| 6,690,522 B2 * | 2/2004 | Kobayashi | G02B 5/04 359/631 |
| 8,625,200 B2 | 1/2014 | Smith et al. | |
| 8,781,794 B2 | 7/2014 | Harrison et al. | |
| 2004/0008157 A1 * | 1/2004 | Brubaker | G02B 27/0176 345/8 |
| 2012/0002046 A1 * | 1/2012 | Rapoport | A42B 3/04 348/143 |
| 2012/0050144 A1 | 3/2012 | Morlock | |
| 2012/0326948 A1 * | 12/2012 | Crocco | G09G 5/00 345/7 |
| 2013/0241805 A1 | 9/2013 | Gomez | |
| 2016/0062117 A1 * | 3/2016 | Imasaka | G02B 27/0101 345/7 |

* cited by examiner

FIG. 7

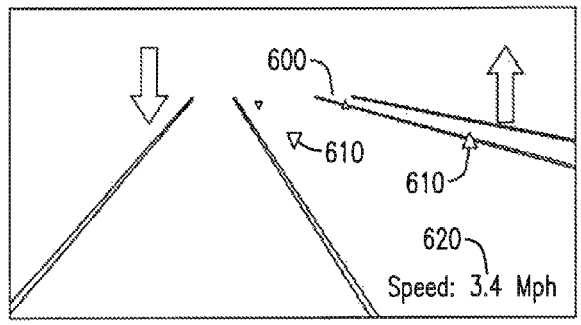

FIG. 8

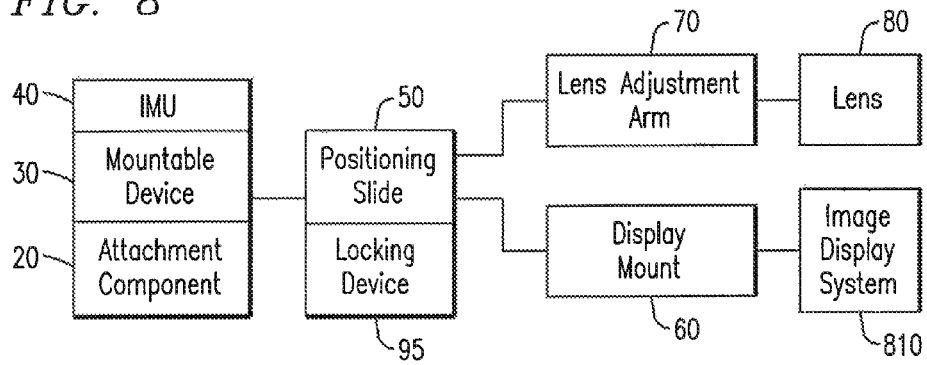

| Securing an augmented reality system, comprising an image display system and lens surface, to an independent garment of a wearer with a mountable component that provides for readily attaching and removal from the independent garment | —910 |

↓

| Adjusting a location of the image display system and the lens surface with a positioning slide attached to the mountable component | —920 |

↓

| Locking the location of the image display system and the lens surface in place once the location is selected, wherein the mountable component and positioning slide are located outside of a field of view realized through the lens surface | —930 |

SYSTEM AND METHOD FOR PROVIDING AN AUGMENTED REALITY LIGHTWEIGHT CLIP-ON WEARABLE DEVICE

BACKGROUND

Embodiments relate to head-mounted display apparatus employing one or more reflective optical surfaces, e.g., one or more free space, ultra-wide angle, reflective optical surfaces (hereinafter abbreviated as "FS/UWA/RO surfaces"). More particularly, embodiments relate to a clip-on head-mounted display apparatus in which reflective optical surfaces such as FS/UWA/RO surfaces are employed to display imagery from a light-emitting display system held in close proximity to a user's eye.

A head-mounted display such as a helmet-mounted display or eyeglass-mounted display (abbreviated herein as "HMD") is a display device worn on the head of an individual that has one or more small display devices located near one eye or, more commonly, both eyes of the user. FIG. 1 shows the basic elements of one type of prior art HMD which includes a display 11, a reflective optical surface 13, and an eye 15 having a center of rotation 17. As shown in this figure, light 19 from display 11 is reflected by surface 13 and enters the user's eye 15.

Some HMDs display only simulated (computer-generated) images, as opposed to real-world images and, accordingly, are often referred to as "virtual reality" or immersive HMDs. Other HMDs superimpose (combine) a simulated image upon a non-simulated, real-world image. The combination of non-simulated and simulated images allows the HMD user to view the world through, for example, a visor or eyepiece on which additional data relevant to the task to be performed is superimposed onto the forward field of view (FOV) of the user. This superposition is sometimes referred to as "augmented reality" or "mixed reality."

Combining a non-simulated, real-world view with a simulated image can be achieved using a partially-reflective/partially-transmissive optical surface (a "beam splitter") where the surface's reflectivity is used to display the simulated image as a virtual image (in the optical sense) and the surface's transmissivity is used to allow the user to view the real world directly (referred to as an "optical see-through system"). Combining a real-world view with a simulated image can also be done electronically by accepting video of a real world view from a camera and mixing it electronically with a simulated image using a combiner (referred to as a "video see-through system"). The combined image can then be presented to the user as a virtual image (in the optical sense) by means of a reflective optical surface, which in this case need not have transmissive properties.

From the foregoing, it can be seen that reflective optical surfaces can be used in HMDs which provide the user with: (i) a combination of a simulated image and a non-simulated, real world image; (ii) a combination of a simulated image and a video image of the real world; or (iii) purely simulated images. (The last case is often referred to as an "immersive" system.) In each of these cases, the reflective optical surface produces a virtual image (in the optical sense) that is viewed by the user. Historically, such reflective optical surfaces have been part of optical systems whose exit pupils have substantially limited not only the dynamic field of view available to the user, but also the static field of view. Specifically, to see the image produced by the optical system, the user needed to align his/her eye with the optical system's exit pupil and keep it so aligned, and even then, the image visible to the user would not cover the user's entire full static field of view, i.e., the prior optical systems used in HMDs that have employed reflective optical surfaces have been part of pupil-forming systems and thus have been exit-pupil-limited.

The reason the systems have been so limited is the fundamental fact that the human field of view is remarkably large. Thus, the static field of view of a human eye, including both the eye's foveal and peripheral vision, is on the order of ~150° in the horizontal direction and on the order of ~130° in the vertical direction. (For the purposes of this disclosure, 150 degrees will be used as the straight ahead static field of view of a nominal human eye.) Well-corrected optical systems having exit pupils capable of accommodating such a large static field of view are few and far between, and when they exist, they are expensive and bulky.

Moreover, the operational field of view of the human eye (dynamic field of view) is even larger since the eye can rotate about its center of rotation, i.e., the human brain can aim the human eye's foveal+peripheral field of view in different directions by changing the eye's direction of gaze. For a nominal eye, the vertical range of motion is on the order of ~40° up and ~60° down and the horizontal range of motion is on the order of ±~50° from straight ahead. For an exit pupil of the size produced by the types of optical systems previously used in HMDs, even a small rotation of the eye would substantially reduce what overlap there was between the eye's static field of view and the exit pupil and larger rotations would make the image disappear completely. Although theoretically possible, an exit pupil that would move in synchrony with the user's eye is impractical and would be prohibitively expensive.

In view of these properties of the human eye, there are three fields of view which are relevant in terms of providing an optical system which allows a user to view an image generated by an image display system in the same manner as he/she would view the natural world. The smallest of the three fields of view is that defined by the user's ability to rotate his/her eye and thus scan his/her fovea over the outside world. The maximum rotation is on the order of ±50° from straight ahead, so this field of view (the foveal dynamic field of view) is approximately 100°. The middle of the three fields of view is the straight ahead static field of view and includes both the user's foveal and peripheral vision. As discussed above, this field of view (the foveal+peripheral static field of view) is on the order of 150°. The largest of the three fields of view is that defined by the user's ability to rotate his/her eye and thus scan his/her foveal plus his/her peripheral vision over the outside world. Based on a maximum rotation on the order of ±50° and a foveal+peripheral static field of view on the order of 150°, this largest field of view (the foveal+peripheral dynamic field of view) is on the order of 200°. This increasing scale of fields of view from at least 100 degrees to at least 150 degrees and then to at least 200 degrees provides corresponding benefits to the user in terms of his/her ability to view images generated by an image display system in an intuitive and natural manner.

Two such inventions which provide systems and methods for head-mounted displays that have improved compatibility with the field of view, both static and dynamic, of the human eye are disclosed in U.S. Pat. No. 8,625,200 and U.S. Pat. No. 8,781,794, both incorporated by reference as both provide for head-mounted displays that employ reflective optical surfaces which provide an ultra-wide angle field of view.

Currently, HMDs generally consist of large plastic/metal structures that attached directly to head of a user. These structures are often similar to glasses or binoculars and sit very close to the eyes of the user, thus sometimes not allowing the user to wear glasses which may have corrective lenses. Furthermore, such current systems also generally restrict the user's vision which provides for a perception of tunnel vision, thus making it very intrusive when trying to look around. For example, as currently implemented, Google Glass™ is limited to requiring its users to look in a small corner to see imagery as opposed to using the full visual area of the user or the full visual area of an eye of the user. Even though display technology is now available, due primarily to the above incorporated by reference patent applications, a need still exists for a lightweight augmented reality ("AR") heads up display system that is not limited to only one method of use/implementation by the user, but that is also user configurable, such as to allow the user to utilize the AR system in conjunction with corrective lenses.

DEFINITIONS

The phrase "virtual image" is used in its optical sense, i.e., a virtual image is an image that is perceived to be coming from a particular place where in fact the light being perceived does not originate at that place.

An FS/UWA/RO surface is referred to herein as a "free space" surface because its local spatial positions, local surface curvatures, and local surface orientations are not tied to a particular substrate, such as the x-y plane, but rather, during the surface's design, are determined using fundamental optical principles (e.g., the Fermat and Hero least time principle) applied in three dimensional space.

The FS/UWA/RO surface is referred to as an "ultra-wide angle" surface because, during use, at a minimum, it does not limit the dynamic foveal field of view of a nominal user's eye. As such, depending on the optical properties of optional optical components that may be used with the "ultra-wide angle" surface, e.g., a Fresnel lens system, the overall optical system of the HMD can be non-pupil forming, i.e., unlike conventional optical systems that have an exit pupil which limits the user's field of view, the operative pupil for various embodiments of the optical systems disclosed herein will be the entrance pupil of the user's eye as opposed to one associated with the external optical system. Concomitantly, for these embodiments, the field of view provided to the user will be much greater than conventional optical systems where even a small misalignment of the user's eye with the exit pupil of the external optical system can substantially reduce the information content available to the user and a larger misalignment can cause the entire image to disappear.

Throughout this disclosure, the following phrases/terms shall have the following meanings/scope:

(1) The phrase "a reflective optical surface" (also referred to herein as a "reflective surface") shall include surfaces that are only reflective as well as surfaces that are both reflective and transmissive. In either case, the reflectivity can be only partial, i.e., part of the incident light can be transmitted through the surface. Likewise, when the surface is both reflective and transmissive, the reflectivity and/or the transmissivity can be partial. As discussed below, a single reflective optical surface can be used for both eyes or each eye can have its own individual reflective optical surface. Other variations include using multiple reflective optical surfaces for either both eyes or individually for each eye. Mix and match combinations can also be used, e.g., a single reflective optical surface can be used for one eye and multiple reflective optical surfaces for the other eye. As a further alternative, one or multiple reflective optical surfaces can be provided for only one of the user's eyes. The claims set forth below are intended to cover these and other applications of the reflective optical surfaces disclosed herein. In particular, each claim that calls for a reflective optical surface is intended to cover head-mounted display apparatus that includes one or more reflective optical surfaces of the type specified.

(2) The phrase "an image display system having at least one light-emitting surface" is used generally to include any display system having a surface which emits light whether by transmission of light through the surface, generation of light at the surface (e.g., by an array of LEDs), reflection off of the surface of light from another source, or the like. The image display system can employ one or multiple image display devices, e.g., one or multiple LED and/or LCD arrays. As with reflective optical surfaces, a given head-mounted display apparatus can incorporate one or more image display systems for one or both of the user's eyes. Again, each of the claims set forth below that calls for an image display system is intended to cover head-mounted display apparatus that includes one or more image display systems of the type specified.

(3) The phrase "binocular viewer" means an apparatus that includes at least one separate optical element (e.g., one display device and/or one reflective optical surface) for each eye.

(4) The phrase "field of view" and its abbreviation FOV refer to the "apparent" field of view in image (eye) space as opposed to the "real" field of view in object (i.e., display) space.

SUMMARY

Embodiments relate to a system and method for attaching an augmented reality device to an independent garment. The system comprises a mountable component configured with an attachment to allow the mountable component to be readily attached to and removed from an independent wearable garment. The system further comprises a positioning slide connected to the mountable component, a display mount connected to the positioning slide, a lens adjustment arm attached to the positioning slide, and a curved lens surface connected to the lens adjustment arm. The positioning slide is configured to move the lens and display mount in a back and forth direction and a left to right direction.

Another system comprises a mountable component configured to attach to the independent garment. The system also comprises a display mount configured to hold an image display system, the display mount configured to move in a forward and backward direction and a left and right direction. The system further comprises a lens adjustment arm configured to connect to a lens surface, the lens adjustment arm configured to move in a forward and backward direction and a left and right direction.

The method comprises securing an augmented reality system, comprising an image display system and lens surface, to an independent garment of a wearer with a mountable component that provides for readily attaching and removal from the independent garment. The method also comprises adjusting a location of the image display system and the lens surface with a positioning slide attached to the mountable component, and locking the location of the image display system and the lens surface in place once the location is selection, wherein the mountable component and positioning slide are located outside of a field of view realized through the lens surface.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 7 shows an embodiment of an augmented reality imagery which may be overlaid on the AR system;

FIG. 8 shows a block diagram of the system; and

FIG. 9 shows a flowchart illustrating an embodiment of a method.

DETAILED DESCRIPTION

Figure 1:
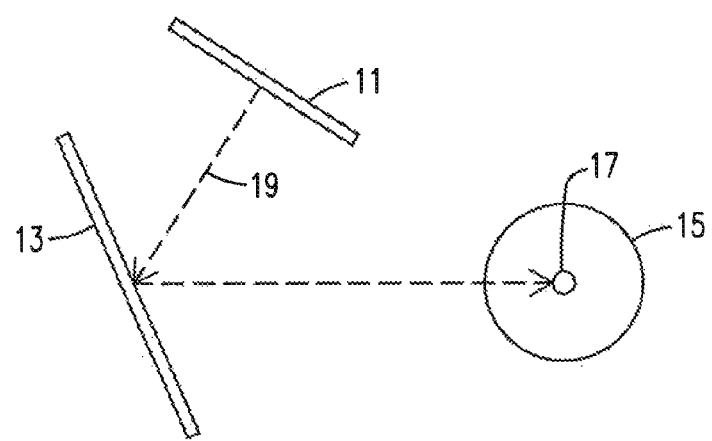
FIG. 1 shows a prior art illustration of a head mountable device ("HMD")

Embodiments are described herein with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, readily recognizes that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Figure 2:
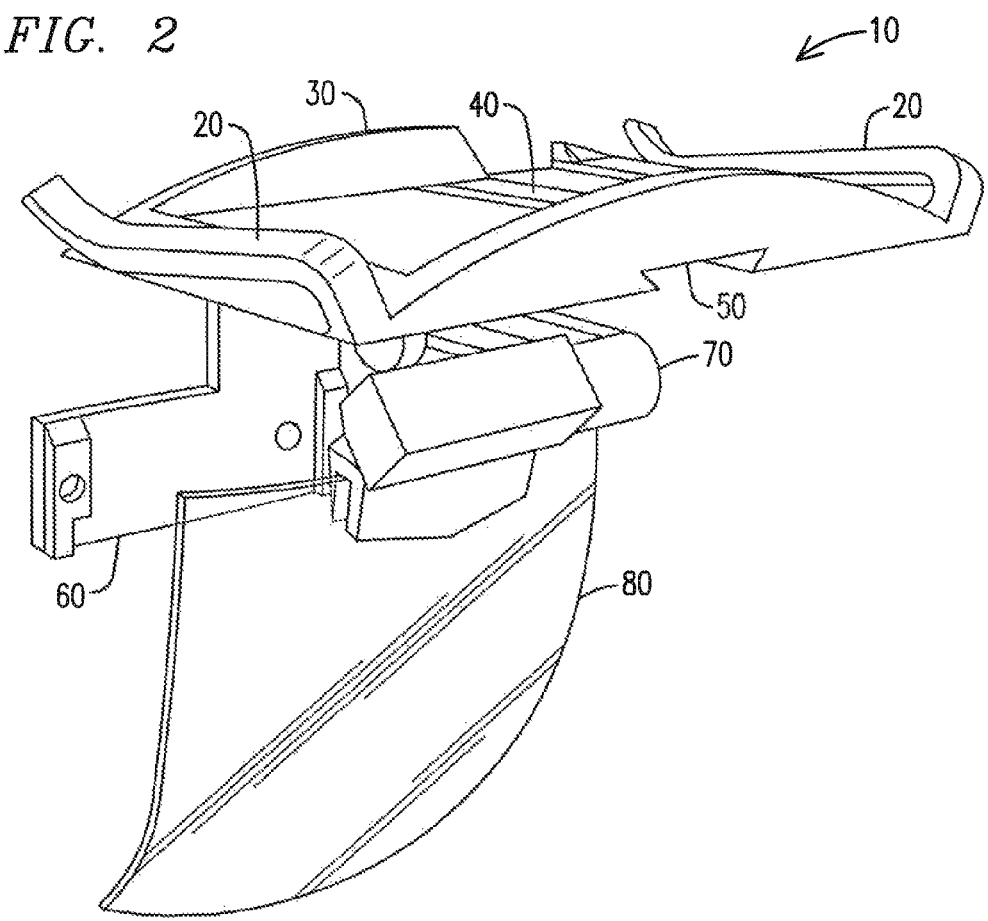
FIG. 2 shows an embodiment of an augmented reality ("AR") lightweight clip-on wearable device or system.

FIG. 2 shows an embodiment of an augmented reality ("AR") lightweight clip-on wearable device or system. The embodiment in FIG. 2 is applicable to a bill or brim of a hat, such as, but not limited to, the bill of a baseball hat. As used herein, the term "bill" is used to also comprise the term "brim." Other non-limiting embodiments may be applicable to other wearable components or garments, which may not comprise a bill, such as, but not limited to, a helmet, ski googles, eye glasses, visor, etc. More specifically, though the AR system disclosed herein is primarily disclosed with respect to a bill of a hat, the embodiments are also applicable to other independent garments/wearable components. The term "independent" is used with respect to garment/wearable component to further define the garment/wearable component as being one that is not designed specifically to provide an attachment point or location for the AR system 10. Instead, the attachment point on the garment/wearable component is provided for at least one other purpose/function not related to the AR system 10. Therefore, as a non-limiting example, with respect to a baseball cap, the brim or bill is provided for other purposes, namely, style and/or as shade from the sun. These purposes are independent of also being able to attach the AR system 10.

As illustrated, the AR system 10 comprises a freely-releasable attachment component 20, such as, but not limited to, a clip-on, configured to allow for attachment and detachment from the bill of the hat. The term "freely-releasable" is used to illustrate that the AR system 10 may be transferable from one wearable garment/apparatus to another where a permanent attachment or an attachment which may require inclusion or removal of securing devices, such as, but not limited to, bolts, taps, etc., which may be provided to further secure the attachment component 20 to the bill, are not needed. Thus, with respect to the hat, the wearable device may be easily transferable from one hat to another by simply sliding the AR system 10 off of the bill of a first hat and then sliding it onto another by the clip-on 20 securing it to the bill of each hat. There is no need or requirement to modify the bill of the hat in order to apply the clip-on 20 to attach the AR system 10 to the bill.

The attachment component 20, as disclosed herein as the clip-on, is a part of a mountable component 30. An inertial measurement unit (IMU) chip 40 (or simply the IMU) may also be attached to the mountable component 30, which may be provided for head tracking. With the IMU, the system may be used to display information from a cellular phone or another portable computing device, such as, but not limited to, a tablet computer. Head tracking further provides for motion tracking where there is a full position-sensitive and rotation-sensitive capability of the AR system 10. This is possible since the IMU 40 comprises an integration of a 3D accelerometer, 3D gyroscope, and magnetometer on the HMD IMU 40. A positioning slide 50 may also be a part of, or is connected to, the mountable component 30. Attached to the positioning slide 50 may be a display mount 60, such as, but not limited to, a micro display mount, which is provided to hold an image display system 810 as shown in FIG. 8. A lens adjustment arm 70, which may be provided to hold a curved lens 80 (or lens surface), such as, but not limited to, as disclosed in U.S. Pat. No. 8,625,200 and U.S. Pat. No. 8,781,794, is also a part of, or is connected to, the mountable component 30. The curved lens 80 is attached by way of the lens adjustment arm 70.

Pixel lenses, as disclosed in U.S. application Ser. No. 13/327,217, incorporated by reference, may also be used herein as an alternative "light" image generation and optical correction system. When implemented the image display system is replaced with the teaching of U.S. application Ser. No. 13/327,217 wherein the curvature of the reflector (lens 80) may be less curved, or not as curved as disclosed herein. Furthermore, each pixel as, disclosed in U.S. application Ser. No. 13/327,217, may have a lens instead of one, or a single, lens for the AR system 10.

Fresnel lens located between the display system and reflector (curved lens) 80, as taught in U.S. application Ser. No. 13/211,365, incorporated by reference, may be utilized in an embodiment disclosed herein.

Figure 3:
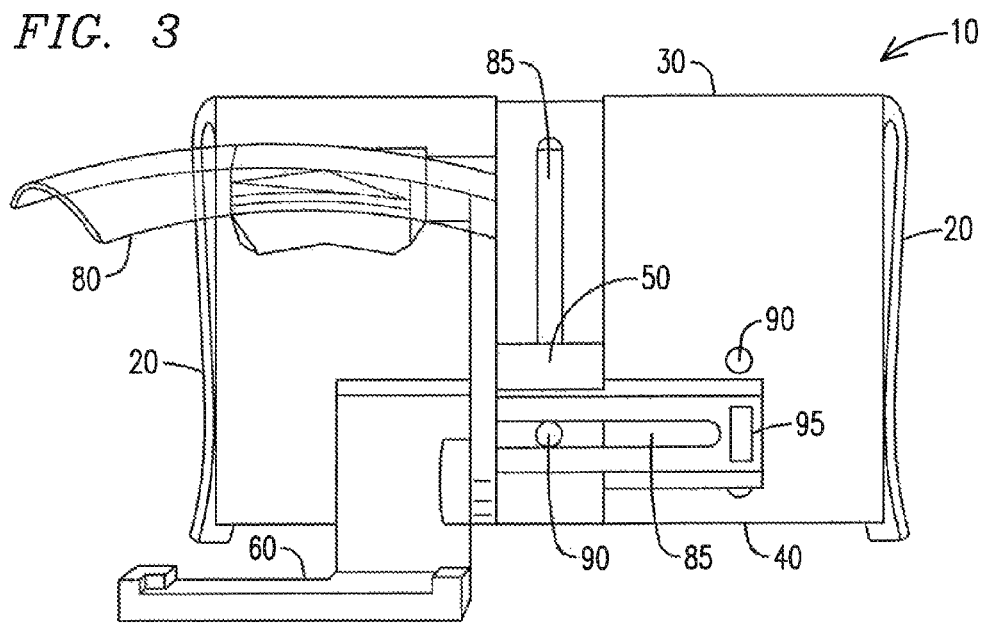
FIG. 3 shows a bottom view of an embodiment of the AR lightweight clip-on wearable device or system.
Figure 4:
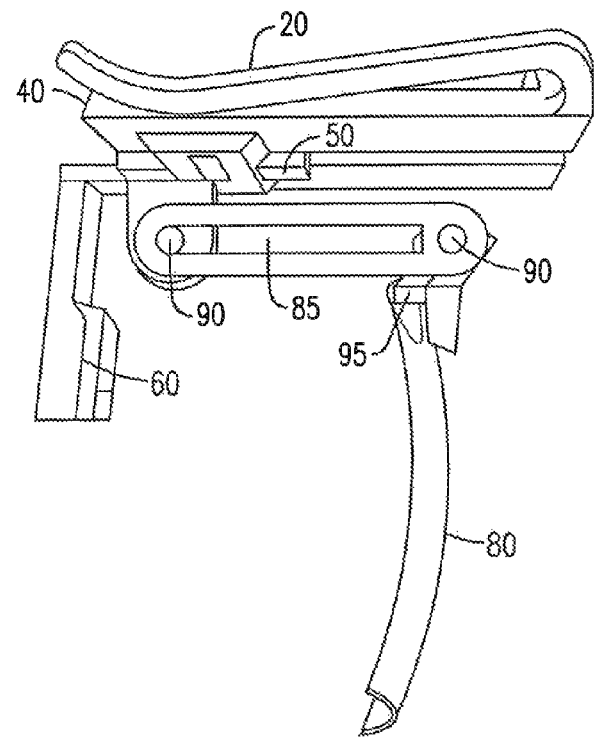
FIG. 4 shows a side view of an embodiment of the AR lightweight clip-on wearable device or system in an upside down rendering.

FIG. 3 shows a bottom view and FIG. 4 shows a side view of an embodiment of the AR lightweight clip-on wearable device or system. In FIG. 4, the side view shows the AR system 10 in an upside down rendering. As further illustrated, the positioning slide 50 may be configured to move the lens 80 and display mount 60 in a back and forth direction and a left to right direction. To do so, guide elements 85, such as, but not limited to, tracks may be provided to direct such movements. Limiters 90 may also be provided, in association with the guide elements 85, to prohibit or limit a range of the positioning slide. A locking device 95 may also be provided to maintain a position of the positioning slide, and hence the display mount 60 and curved lens 80, as selected by the user.

Referring back to FIG. 2, the lens adjustment arm 70 may be configured to allow rotational movement of the curved lens 80, about an attachment point of the curved lens 80 to the lens adjustment arm 70. With an ability to determine placement of the curved lens from the user's eye, the user has placed the lens at a location to provide for sufficient area, or distance, to allow the user to wear eye glasses, such as but not limited to corrective eye glasses, if required. Furthermore, the user has an ability to place the curved lens at a position which provides the best clarity of information displayed on the lens. A locking device 95, or element, may be provided to hold the lens in place once a position is selected. Additionally, with the configuration of the AR system 10 disclosed herein, other than the curved lens 80, which is transparent, other components are located outside of the user's vision so as not to restrict an ability of the user to utilize a full range of vision that the user would have while wearing a hat.

The curved lens 80 may be an FS/UWA/RO surface which is free space, ultra-wide angle, reflective optical surface. The curved lens may be purely reflective or may have both reflective and transmissive properties, in which case, it may be thought of as a type of "beam splitter." The curved lens 80 may curve around a side of the eye and toward a side of the face so as to expand the available horizontal field of view. In one embodiment, the FS/UWA/RO surface may extend up to 180° or more (e.g., more than 200°).

Though only a single lens 80 is shown in use with a single eye, embodiments disclosed herein may be used with two separate curved lenses 80 with one for each eye, or a single curved lens structure that may be placed in front of both eyes.

As discussed above, the image display system may be attached or mounted to the micro display mount 60. The image display system does not require being placed at a tilt or angle since the curved lens 80 may be positioned to provide the best clarity, based on a location of pixels, images, and/or pieces of display information that are to be reflected from the curved lens 80, and based on the user's preferences regarding placement/location of the curved lens 80. The image display system may be made with organic light-emitting diode technology, which is a low power technology. As a non-limiting example, less than ⅓ watts may be required.

The mountable component 30 may also include an electronics package to control the images that are displayed by the image display system. Thus, as discussed above, in an embodiment, the electronics package may include components of an IMU 40, such as, but not limited to, accelerometers and gyroscopes, that provides location, orientation and position information needed to synchronize images from the image display projection system with user activities. Power and video to and from the AR system 10 may be provided through a transmission cable coupled to the electronics package or through a wireless medium. In an embodiment, to ensure that the AR system 10 is as lightweight as possible, parts of the electronics package, such as, but not limited to, video driver, microcomputer, power supply, etc., may be worn elsewhere on the user and not as a part of the AR system 10 attached to the bill of the hat.

A camera (not shown) may be situated on the AR system 10 to provide input to the electronics package to help control the computer generation of, as a non-limiting example, "augmented reality" scenes. The camera may be coupled to the electronics package to receive power and control signals and to provide video input to the electronics package's software.

As discussed above, prior optical systems used in HMDs that have employed reflective optical surfaces have been pupil forming and thus have had limited viewing areas, a typical field of view being ~60 degrees (°) or less. This has greatly limited the value and capability of prior head-mounted display apparatuses. In various embodiments, the AR system 10 disclosed herein has much wider fields of view (FOV), thus allowing much more optical information to be provided to the user compared to HMDs having smaller fields of view. The wide field of view can be greater than 100°, greater than 150°, or greater than 200°. In addition to providing more information, the wide field of view allows the additional information to be processed by the user in a more natural manner, enabling better immersive and augmented reality experiences through a better match of the displayed images to physical reality.

Specifically, in an embodiment, for a straight ahead direction of gaze, the eye is able to take in a whole viewing area by curved FS/UWA/RO lenses 80, corresponding to at least 150 degrees of horizontal field of view (FOV) for an eye (e.g., ~168° of horizontal FOV). This field of view is composed of the eye's foveal field of view and its peripheral field of view. In addition, the eye is allowed to move freely about its center of rotation to aim the combined foveal+peripheral field of view in different directions of gaze, as the eye naturally does when viewing the physical world. The optical systems disclosed herein thus allow the eye to obtain information throughout a range of motion in the same manner as the eye does when viewing the natural world.

Figure 5:
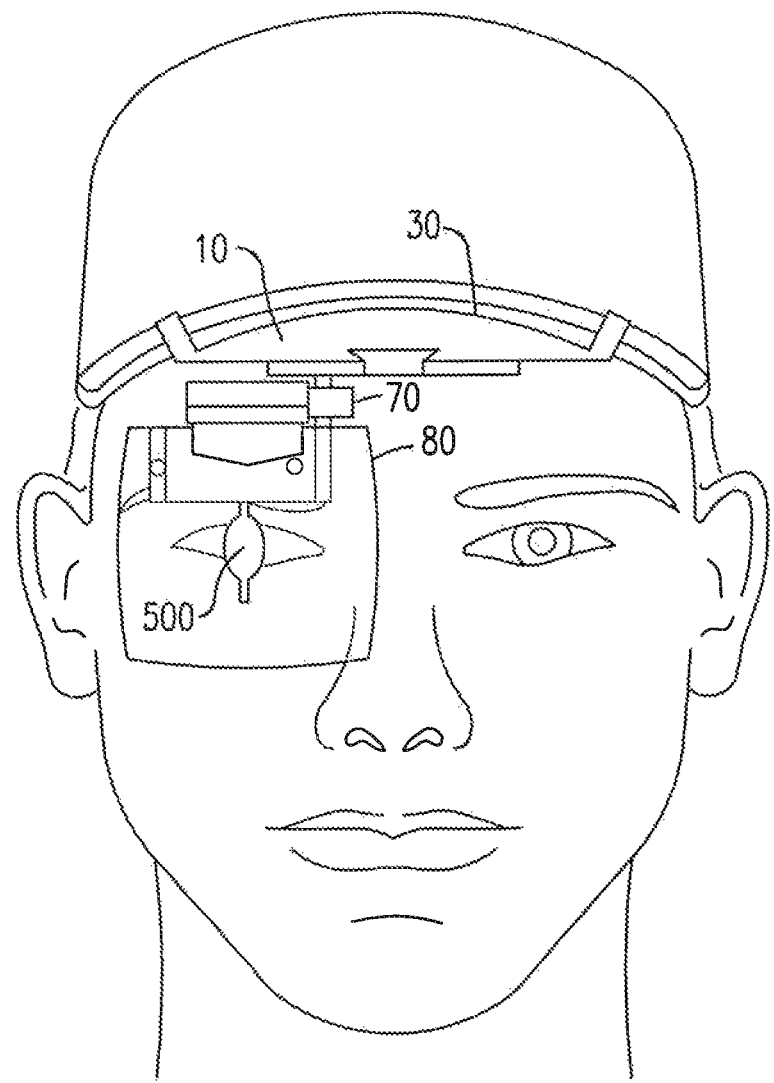
FIG. 5 shows an embodiment of the AR lightweight clip-on wearable device or system worn by a user.

FIG. 5 shows an embodiment of the AR lightweight clip-on wearable device or system worn by a user, though the hat or bill are not visible. As shown, an AR image 500 may be located anywhere within the lens surface 80. Thus, the AR system 10 provides a fluid and natural-feeling AR HMD that allows the user to see the rest of the outside world without any blocking obstructions. Very little structure is provided, thus the AR system 10 is essentially structure less as it does not even get in the way of the bill of the hat. Additionally, the mountable component 30, IMU chip 40, positioning slide 50, display mount 60 and lens adjustment arm 70 are located outside of a field of view realized through the curved lens surface 80. Thus, the AR system 10 does not restrict an ability of the user to utilize a full range of vision that the user would have while wearing a hat and AR system 10.

Figure 6:
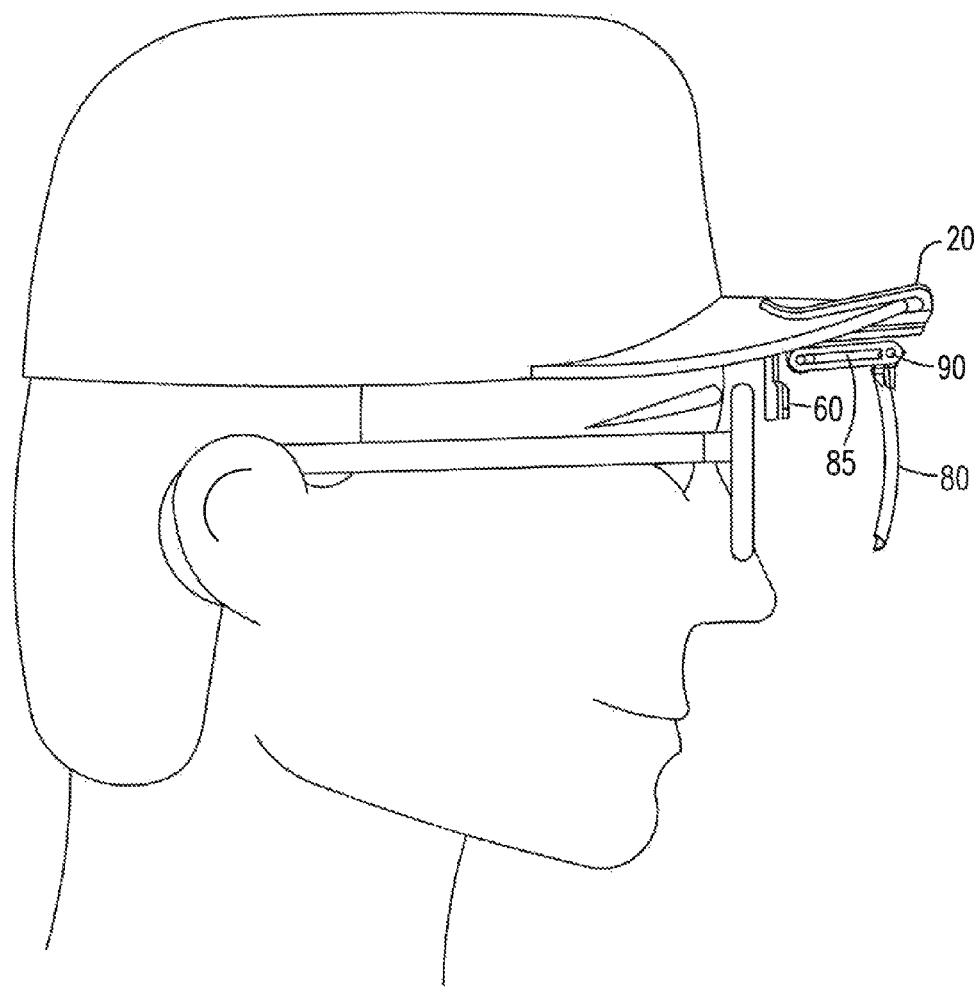
FIG. 6 shows an embodiment of the AR system from a side view with the user wearing glasses.

FIG. 6 shows side view of the AR lightweight clip on wearable device or system worn by the user. The user is wearing eyewear, such as, but not limited to, corrective glasses. The lens surface 80 and/or the image display system 810 may be located so that the lens surface 80 and/or image display system 810 provides for room for the user to wear the corrective glasses.

Though only a lens surface 80 is illustrated as being in front of a single eye, the lens surface may be a continual lens surface which is in front of both eyes. In another non-limiting embodiment, individually movable lens surfaces may be provided where each individual lens may be placed before a respective eye. However, as explained herein, only a lens 80 before a single eye may be used.

FIG. 7 shows an embodiment of an augmented reality imagery which may be overlaid on the AR system. As illustrated, a street 600, or path, is visible through the AR system 10. Lanes of motion 610 are overlaid with the street 600, or path. Also overlaid is a current speed 620 the user is traveling.

FIG. 8 shows a block diagram illustrating the system. As shown, a mountable component 30 is provided as a part of the system 10. The mountable component may have an attachment component 20. A display mount 60 and lens adjustment arm 70 may be included. The display mount 60 may be configured to hold the image display system 810 whereas the lens adjustment arm 70 may be configured to hold the lens or lens surface 80. The display mount 60 and the lens adjustment arm 70 may be configured to move in a forward and backward direction and a left and right direction. These movements may be possible as both the display mount 60 and the lens adjustment arm 70 may be connected to the positioning slide 50 that is connected to the mountable component. The positioning slide 50 may further comprise the locking device 95 configured to maintain a position of a location selected for either the lens adjustment arm 70 or the display mount 60.

The inertial measurement unit 40 may be connected to the mountable component 30. The lens adjustment arm 70 may be configured to provide for rotational movement of the curved lens 80 about an attachment point of the curved lens 80 to the lens adjustment arm 70. The mountable component 30, positioning slide 50, IMU 40, display mount 60 and lens adjustment arm 70 may be located outside of a field of view realized through the lens surface 80.

The AR system 10 disclosed herein is lightweight, a factor of 10 times to 100 times lighter, when compared to existing systems. Whereas competitive systems can weigh more than seven pounds, the AR system 10 is only a few grams, thus making it light enough to attach to a baseball cap, or other wearable components/garments as disclosed herein. Such a light weight also contributes to a low inertial mass, which is beneficial to pilots performing high-gravity maneuvers or when the user head turns suddenly.

The light weight is attributed to a few factors. One factor is that there are few components of the AR system 10, where each component is miniaturized and manufactured to be lightweight. In an embodiment, the lens 80 and micro-display may weigh less than 5 grams. Considering just the lens 10, micro-display, IMU 40, the clip-on 20, and mounting support 60 (excluding the wires), the AR system 10 weighs less than 34 grams (which is about 0.075 pounds). The current support electronics may weigh up about 137 grams, but this weight will be reduced as electronics are further miniaturized. As a non-limiting example, an improved design for a video board is expected to weigh no more than about 16 grams.

While the lens surface may be created using one of the methods disclosed in at least one of U.S. Pat. No. 8,625,200 and U.S. Pat. No. 8,781,794, which are both incorporated by reference, many of the components disclosed herein may also be constructed using 3D printing technology. In another non-limiting embodiment, the lens, and other components disclosed herein may be made using injection molding. Additionally, other methods of lens creation may be used, such as, but not limited to, injection molding.

FIG. 9 shows a method. The method 900 comprises securing an augmented reality system, comprising an image display system and lens surface, to an independent garment of a wearer with a mountable component that provides for readily attaching and removal from the independent garment, at 910. The method 900 further comprises adjusting a location of the image display system and the lens surface with a positioning slide attached to the mountable component, at 920. Adjusting the location of the image display may comprise the image display system in a forward direction, backward direction, left direction, or right direction. Adjusting the location of the lens surface may comprise moving the lens surface in a forward direction, backward direction, left direction, right direction, and rotationally about an attachment point of the lens to the lens adjustment arm that is a part of, or attached to the positioning slide. The method 900 also comprises locking the location of the image display system and the lens surface in place once the location is selection, wherein the mountable component and positioning slide are located outside of a field of view realized through the lens surface, at 930.

Thus, the AR system 10 provides optical see-through augmented reality whereas most other systems provide just immersive virtual reality. Some prior art systems provide video-see-through AR, but few provide optical AR, and none have as few optical components nor do they have such a structure less embodiment as disclosed herein as the lens surface 80 is only attached to sufficiently enough to hold it to the mountable component. The lens surface 80 does not have a frame which encircles any of the outer edge of the lens surface. Wherein some prior art HMD systems are helmets, which are heavy, hot and expensive, the AR system 10 disclosed herein is not as heavy, hot, or expensive when compared with those prior art technologies.

Furthermore, as disclosed, the only components which may be worn on the head of the user, connected to the mountable device 30, are a single curved lens 80 (also known as a beam splitter) per eye, one micro-display per eye, a single IMU 40, micro-display electronics, and associated wires needed to allow these components to operate together. The rest of system, such as, but not limited to, the video drive, microcomputer, power supply, etc., may be worn elsewhere on user.

The AR system 10 disclosed herein only requires one optical element 80 (the curved beam splitter) per eye whereas most other prior art HMDs require multiple optical elements, both for immersive (non-see through) or optical AR.

While various disclosed embodiments have been described above, it should be understood that they have been presented by way of example only, and not limitation. Numerous changes to the subject matter disclosed herein can be made in accordance with the embodiments disclosed herein without departing from the spirit or scope of the embodiments. In addition, while a particular feature may have been disclosed with respect to only one of several implementations, such feature may be combined with one or more other features of the other implementations as may be desired and advantageous for any given or particular application.

Therefore, the breadth and scope of the subject matter provided herein should not be limited by any of the above explicitly described embodiments. Rather, the scope of the embodiments should be defined in accordance with the following claims and their equivalents.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While embodiments have been described with reference to various embodiments, it will be understood by those skilled in the art that various changes, omissions and/or additions may be made and equivalents may be substituted for elements thereof without departing from the spirit and scope of the embodiments. In addition, many modifications may be made to adapt a particular situation or material to the teachings of the embodiments without departing from the scope thereof. Therefore, it is intended that the embodiments not be limited to the particular embodiment disclosed as the best mode contemplated, but that all embodiments falling within the scope of the appended claims are considered.

The invention claimed is:

1. A system comprising:
   a mountable component configured with an attachment to allow the mountable component to be readily attached to and removed from an independent wearable garment worn about a head of a user;
   a positioning slide, connected to the mountable component;
   a lens adjustment arm attached to the positioning slide;
   a curved lens surface connected to the lens adjustment arm, the curved lens surface having a field of view (FOV) of a real-world view; and
   a display mount connected to the positioning slide, the display mount to support an image display system at a position to superimpose an augmented reality image into the real-world view;
   wherein the positioning slide is configured to linearly move the curved lens surface and display mount in a back and forth direction and a guide element configured to linearly move in a left to right direction and the mountable component, the positioning slide and the display mount when attached to the independent wearable garment are located outside of the FOV as realized through the curved lens surface where in the mountable component comprises a clip on a first side; the positioning slide located at a second side of the mountable component wherein the first side and second side are different and opposite sides; the display mount coupled to a first end of the positioning slide: and the lens, adjustment arm-adjustable about a second end of the positioning slide wherein the display mount is configured to be positioned in close proximity to eyes of the user.

2. The system according to claim 1, further comprising an inertial measurement unit connected to the mountable component.

3. The system according to claim 2, wherein the inertial measurement unit is configured to provide for head tracking.

4. The system according to claim 1, further comprising the image display system wherein the display mount is configured to secure the image display system.

5. The system according to claim 1, wherein the positioning slide further comprises a locking device configured to maintain a position of the positioning slide selected.

6. The system according to claim 1, wherein the lens adjustment arm is configured to provide for rotational movement of the curved lens surface about an attachment point of the curved lens surface to the lens adjustment arm.

7. The system according to claim 1, wherein the curved lens surface and the display mount are selectively adjusted via the positioning slide to position the curved lens surface and the display mount in front of eye glasses worn by the user.

8. The system according to claim 2, wherein the inertial measurement unit is located outside of a field of view realized through the curved lens surface.

9. A system for securing an augmented reality device to an independent garment, the system comprising:
   a mountable component having a first side and a second side, the mountable component having a clip on the first side wherein the first side and second side are different and opposite sides and the clip configured to attach to the independent garment;
   a positioning slide located at the second side of the mountable component, the positioning slide having a first end and second end, the first end configured to be positioned at a location in closer proximity to eyes of a user than the second end;
   a lens adjustment arm adjustable about a second end of the positioning slide configured to move back and forth direction, the lens adjustment arm configured to move in a forward and backward direction and
   a guide element configured to move left and right direction and to support a curved lens surface having a field of view (FOV) of a real-world view; and
   a display mount coupled to the first end of the positioning slide to support an image display system which superimposes an augmented reality image in the real-world view, the display mount configured to move in a forward and backward direction and a left and right direction.

10. The system according to claim 9, wherein the positioning slide is configured to connect to the display mount and the lens adjustment arm to provide for at least one of a movement in the forward and backward direction and a movement in the left and right direction.

11. The system according to claim 9, further comprising an inertial measurement unit connected to the mountable component.

12. The system according to claim 11, wherein the inertial measurement unit is configured to provide for head tracking.

13. The system according to claim 9, further comprising the curved lens surface having field of view (FOV) of the real-world view.

14. The system according to claim 10, wherein the positioning slide further comprises a locking device configured to maintain a position of a location selected.

15. The system according to claim 9, wherein the lens adjustment arm is configured to provide for rotational movement of the curved lens surface about an attachment point of the curved lens surface to the lens adjustment arm.

16. The system according to claim 9, wherein the curved lens surface and the display mount are selectively adjusted via the positioning slide to position the curved lens surface and the display mount in front of eye glasses worn by the user.

17. The system according to claim 11, wherein the mountable component, the positioning slide, the display mount, the lens adjustment arm and the inertial measurement unit are located outside of the field of view realized through the lens surface.

\* \* \* \* \*